United States Patent
Bienaime et al.

(10) Patent No.: US 12,155,287 B2
(45) Date of Patent: Nov. 26, 2024

(54) ROTARY ELECTRICAL MACHINE AND ROTOR FOR SUCH MACHINE

(71) Applicant: SKF Magnetic Mechatronics, Saint-Marcel (FR)

(72) Inventors: Francis Bienaime, Mont Saint-Aignan (FR); Eduardo Carrasco, Saint Etienne sous Bailleul (FR); Julien Boisson, Gaillon (FR); Alain Boulier, Villegats (FR)

(73) Assignee: SKF Magnetic Mechatronics, Saint-Marcel (FR)

( * ) Notice: Subject to any disclaimer, the term of this patent is extended or adjusted under 35 U.S.C. 154(b) by 0 days.

(21) Appl. No.: 17/902,514

(22) Filed: Sep. 2, 2022

(65) Prior Publication Data

US 2023/0072259 A1    Mar. 9, 2023

(51) Int. Cl.
| | |
|---|---|
| *H02K 5/08* | (2006.01) |
| *H01F 7/02* | (2006.01) |
| *H02K 1/04* | (2006.01) |
| *H02K 5/02* | (2006.01) |

(52) U.S. Cl.
CPC .............. *H02K 5/08* (2013.01); *H01F 7/0221* (2013.01); *H02K 1/04* (2013.01); *H02K 5/02* (2013.01)

(58) Field of Classification Search
CPC ............ H02K 1/04; H02K 1/278; H02K 5/02; H02K 5/08; H02K 5/128; H02K 5/203; H02K 7/09
See application file for complete search history.

(56) References Cited

U.S. PATENT DOCUMENTS

| | | | |
|---|---|---|---|
| 3,867,658 A | 2/1975 | Dochterman | |
| 4,492,884 A * | 1/1985 | Asano | H02K 5/128 |
| | | | 264/272.13 |
| 4,679,313 A * | 7/1987 | Schultz | H02K 3/47 |
| | | | 310/156.28 |
| 4,729,160 A * | 3/1988 | Brown | H02K 15/03 |
| | | | 310/156.28 |
| 5,233,248 A | 8/1993 | Kawamura et al. | |
| 5,541,460 A * | 7/1996 | Dunfield | F16C 32/0425 |
| | | | 310/90 |
| 6,445,095 B1 | 9/2002 | Liang et al. | |
| 6,504,281 B1 * | 1/2003 | Smith | H02K 11/00 |
| | | | 310/191 |
| 7,183,683 B2 * | 2/2007 | Shafer | H02K 1/278 |
| | | | 310/104 |

(Continued)

FOREIGN PATENT DOCUMENTS

| | | |
|---|---|---|
| CN | 102088214 B | 10/2012 |
| CN | 106505767 A | 3/2017 |

(Continued)

OTHER PUBLICATIONS

CN-107204684-A, Degner, all pages (Year: 2017).*

*Primary Examiner* — Naishadh N Desai
(74) *Attorney, Agent, or Firm* — GARCIA-ZAMOR INTELLECTUAL PROPERTY LAW, LLC; Ruy Garcia-Zamor

(57) ABSTRACT

A rotor for rotary electrical machine. The rotor providing a shaft and magnets supported by the shaft. The rotor further provides a protecting sleeve, extending around an outer surface of the magnets and being made at least partially of PEEK or epoxy resin.

20 Claims, 2 Drawing Sheets

(56) References Cited

U.S. PATENT DOCUMENTS

| | | | |
|---|---|---|---|
| 9,018,817 B2* | 4/2015 | Bradley | H02K 5/128 |
| | | | 310/156.31 |
| 10,075,041 B2 | 9/2018 | Claycomb et al. | |
| 11,460,038 B2 | 10/2022 | Beck et al. | |
| 2003/0127924 A1* | 7/2003 | Van Dine | H02K 5/128 |
| | | | 310/87 |
| 2005/0264113 A1* | 12/2005 | Suzuki | F16K 31/508 |
| | | | 310/80 |
| 2006/0226724 A1* | 10/2006 | Cullen | H02K 1/278 |
| | | | 310/156.31 |
| 2008/0218015 A1 | 9/2008 | Weeber et al. | |
| 2012/0055193 A1 | 3/2012 | Fukasaku | |
| 2015/0357885 A1* | 12/2015 | Koiwai | H02K 11/25 |
| | | | 310/68 C |
| 2016/0156251 A1 | 6/2016 | Sakurai et al. | |
| 2018/0034341 A1* | 2/2018 | Petrucci | H02K 15/02 |
| 2020/0119606 A1* | 4/2020 | Murakami | H02K 15/12 |
| 2020/0235640 A1 | 7/2020 | Sanderson et al. | |
| 2020/0336031 A1* | 10/2020 | Takahashi | H02K 1/279 |

FOREIGN PATENT DOCUMENTS

| | | | | |
|---|---|---|---|---|
| CN | 107204684 A | * | 9/2017 | B60K 1/00 |
| CN | 109863310 A | | 6/2019 | |
| EP | 2584210 A1 | | 4/2013 | |
| EP | 1967286 B1 | | 5/2014 | |
| EP | 2097965 B1 | | 5/2016 | |
| EP | 2348614 B1 | | 6/2016 | |
| EP | 3113339 A1 | | 1/2017 | |
| FR | 2087127 A5 | | 12/1971 | |
| GB | 2485149 B | | 11/2014 | |
| JP | S5996843 A | | 6/1984 | |
| JP | S59222057 A | | 12/1984 | |
| WO | 2017175534 A1 | | 10/2017 | |
| WO | 2018221008 A1 | | 12/2018 | |

* cited by examiner

ROTARY ELECTRICAL MACHINE AND ROTOR FOR SUCH MACHINE

CROSS-REFERENCE TO RELATED APPLICATIONS

This application claims priority to European Patent Application no. 21194719.7, filed Sep. 3, 2021, the contents of which is fully incorporated herein by reference.

TECHNICAL FIELD OF THE INVENTION

The present invention generally relates to rotary electrical machine, notably hermetic rotary electrical machine and more precisely, rotary electrical machine cooled by explosive and/or aggressive gas. In particular, the invention concerns a rotor for rotary electrical machine and a rotary electrical machine including a rotor.

BACKGROUND OF THE INVENTION

A hermetic electrical machine typically includes an electrical motor arranged in a pressurized casing.

A motor compressor unit for $H_2$ applications such as liquefaction of hydrogen is an example of hermetic electrical machine.

In such application, the presence of $H_2$ which is an aggressive and corrosive gas, in contact with internal parts leads to degradation of the electrical machine.

For other applications, internal parts of a motor compressor unit may be in contact with a mix of hydrocarbons, $CO_2$ gas, steam and/or liquid water and $H_2S$ gas which are also aggressive and corrosive gas.

Besides, a rotary electrical machine is generally equipped with cooling means for the motor. Cooling means usually include a water and glycol liquid mixture circulating in a jacket for cooling the external part of the stator, as well as processed gas circulating between the stator and the motor for cooling the internal part of the electrical machine.

The processed gas, only way to cool the rotor and the active magnetic bearings of the electrical machine, is typically $H_2$ or flare gas comprising hydrocarbons, carbon dioxide, and steam and liquid water. Directly coming from oil well, flare gas is aggressive and explosive and then incompatible with the electrical machine structure.

Composition and structure of former rotary electrical machine, whose cooling method is usually based on air and refrigerants, are not adapted for being subjected to aggressive and/or explosive gas. These conditions lead to the decrease in its lifetime.

SUMMARY OF THE INVENTION

Consequently, the present invention intends to overcome these disadvantages by providing a rotor compatible with a cooling method based on processed gas circulation, leading to a correct cooling of the electrical machine and preventing from its early deterioration.

One object of the invention is to provide a rotor for rotary electrical machine, the rotor comprising a shaft and magnets supported by the shaft.

Besides, the rotor further comprises a protecting sleeve, extending around an outer surface of the magnets and being made at least partially of PEEK resin or epoxy resin.

Preferably, the protecting sleeve radially comes into contact with the outer surface of the magnets.

Preferably, the rotor further comprises at least first and second rings supported by the shaft, the first ring being mounted at an end of the magnets and the second ring being mounted at an opposite end of the magnets.

Preferably, the first and second rings and the protecting sleeve define together a closed chamber inside which are located the magnets.

Preferably, the rotor further comprises at least two O-ring seals, each of the two O-ring seals being located between one of the two opposite ends of the protecting sleeve and one of the first and second rings.

According to an embodiment, the protecting sleeve is made at least partially of a composite material based on a matrix of PEEK resin or epoxy resin.

Advantageously, the protecting sleeve can be made at least partially of a composite material based on a matrix of PEEK resin or epoxy resin reinforced with fibers.

Preferably, the protecting sleeve is made at least partially of a composite material based on a matrix of PEEK resin or epoxy resin reinforced with carbon fibers.

The invention also concerns a rotary electrical machine comprising a casing delimiting a hermetic chamber, a stator assembly mounted inside the hermetic chamber and comprising a stator provided with windings, and a rotor as described above rotatably mounted within the stator.

According to an embodiment, the stator may include a protecting sleeve extending inside an inner surface of the windings and being made of an amagnetic material.

Advantageously, the protecting sleeve can be made at least partially of PEEK resin or epoxy resin.

Preferably, the protecting sleeve is made at least partially of a composite material reinforced with fibers, preferably carbon fibers.

According to an embodiment, a sealing and cooling element may by overmolded onto the stator.

Preferably, the stator is provided with laminations, the overmolded element is overmolded onto the windings and the laminations.

Preferably, the overmolded element is made of a polymeric material with a polymerization temperature close to the operating temperature of rotary electrical machine.

As an example, the overmolded element may be made of an epoxy resin.

Advantageously, the overmolded element may be located in all the gaps of the hermetic chamber between the casing and the stator.

Preferably, rotary electrical machine comprises at least two flanges adapted to support active magnetic bearing modules on both lateral sides of the stator, the flanges being made of an amagnetic material.

Besides, the flanges may each comprise an inner wall having a shape adapted to conform with the shape of one end of the stator.

Preferably, the flanges are assembled to the rotary electrical machine with at least one Belleville washer.

BRIEF DESCRIPTION OF THE DRAWINGS

At least one of the embodiments of the present invention is accurately represented by this application's drawings which are relied on to illustrate such embodiment(s) to scale and the drawings are relied on to illustrate the relative size, proportions, and positioning of the individual components of the present invention accurately relative to each other and relative to the overall embodiment(s). Those of ordinary skill in the art will appreciate from this disclosure that the present invention is not limited to the scaled drawings and that the illustrated proportions, scale, and relative positioning can be varied without departing from the scope of the present invention as set forth in the broadest descriptions set forth in any portion of the originally filed specification and/or drawings. Other advantages and features of the invention will appear from the detailed description of embodiments of the invention, which are non-limiting examples, illustrated on the appended drawing of which.

DETAILED DESCRIPTION OF THE INVENTION

Figure 1:
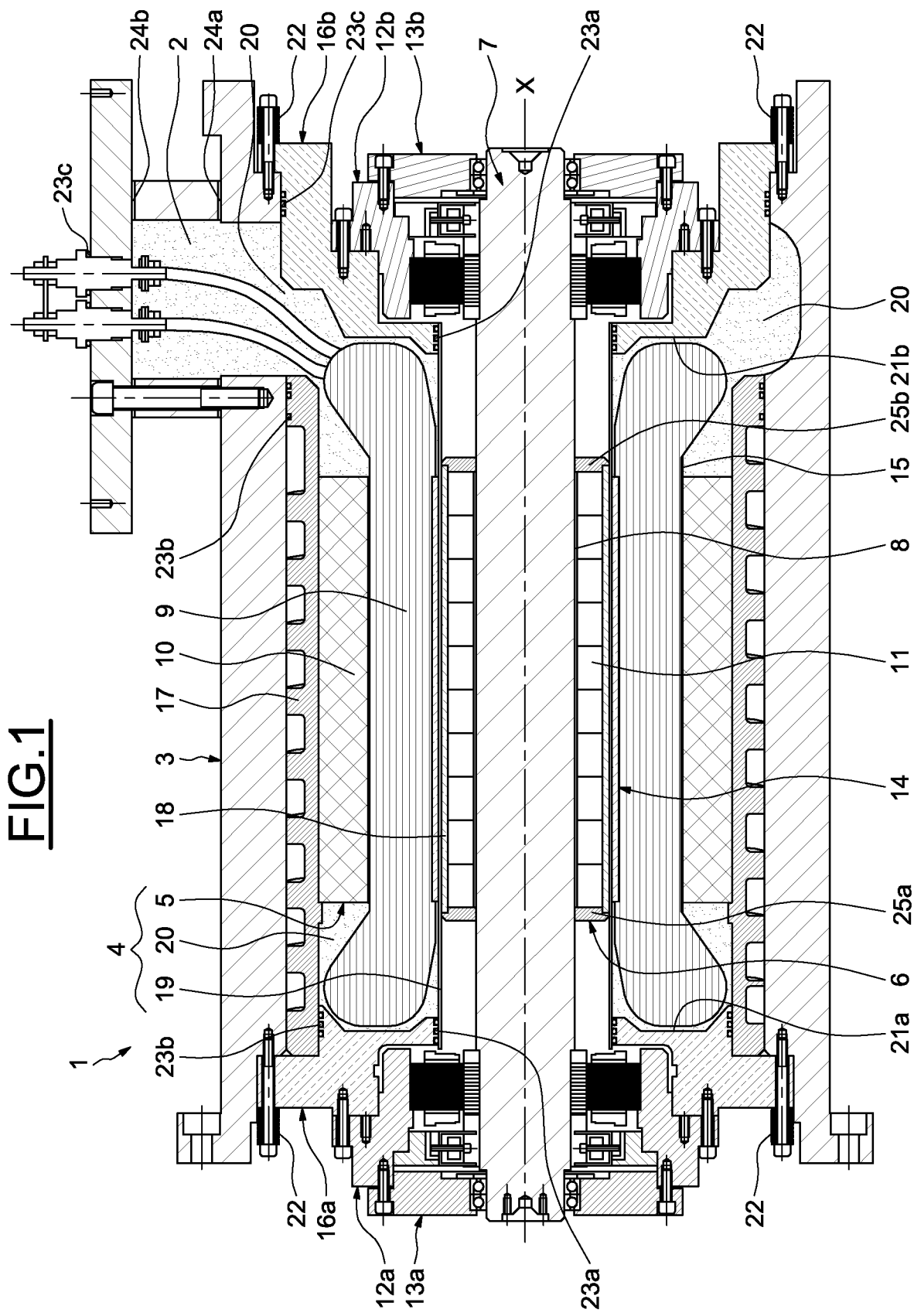
FIG. 1 is a sectional view of a hermetic rotary electrical machine, according to an embodiment of the invention.

Those of ordinary skill in the art will appreciate from this disclosure that when a range is provided such as (for example) an angle/distance/number/weight/volume/spacing being between one (1 of the appropriate unit) and ten (10 of the appropriate units) that specific support is provided by the specification to identify any number within the range as being disclosed for use with a preferred embodiment. For example, the recitation of a percentage of copper between one percent (1%) and twenty percent (20%) provides specific support for a preferred embodiment having two point three percent (23%) copper even if not separately listed herein and thus provides support for claiming a preferred embodiment having two point three percent (23%) copper. By way of an additional example, a recitation in the claims and/or in portions of an element moving along an arcuate path by at least twenty (20°) degrees, provides specific literal support for any angle greater than twenty (20°) degrees, such as twenty-three (23°) degrees, thirty (30°) degrees, thirty-three-point five (33.5°) degrees, forty-five (45°) degrees, fifty-two (52°) degrees, or the like and thus provides support for claiming a preferred embodiment with the element moving along the arcuate path thirty-three-point five (33.5°) degrees. As shown in an embodiment illustrated in FIG. 1, a pressurized and hermetic rotary electrical machine 1 generally comprises a hermetic chamber 2 delimited by a casing 3 of the machine. The illustrated rotary electrical machine 1 is a motor compressor unit.

The rotary electrical machine 1 comprises a stator assembly 4 mounted inside the hermetic chamber 2 and comprising a stator 5 including windings 9.

The rotary electrical machine 1 also comprises a rotor 6 rotatably mounted within the stator 5, and comprising a shaft 7 extending about a central axis X. The rotor 6 includes magnets 11.

The rotary electrical machine 1 may comprise a housing 8 for the shaft 7 advantageously dedicated for the magnets 11 mounting and shrinkage.

The stator 5 has windings 9, advantageously copper wires, for conduction of currents and generation of induction and magnetic field, and laminations 10 for magnetic flux circulation to the rotor 6 and limitation of the magnetic losses generated by the induction variations. Electrical insulation between the laminations limits the eddy currents sources of the losses.

The rotor 6 comprises magnets 11, in particular permanent magnets, supported by the shaft for transmission of the torque, for magnetic interaction with the rotating magnetic field generated by the stator 5. The magnets 11 are stacked against each other in the axial and radial directions.

Besides, the illustrated rotary electrical machine 1 comprises active magnetic bearing (AMB) modules 12a and 12b, for radial guidance of the rotor 6 in normal operation. Preferably, cooling means include processed gas flowing in the hermetic chamber 2 in order to cool AMB modules 12a, 12b, rotor 6, and stator 5.

Back-up bearing modules 13a and 13b can also be provided in case of AMB modules failure. They also support the rotor 6 when AMB modules 12a, 12b are not activated.

The rotary electrical machine 1 preferably includes slot wedges 14 for limitation of magnetic losses and insulation paper 15 for electric insulation of wires, laminations and slot wedges 14.

Preferably, at least two flanges 16a and 16b are adapted to support the active magnetic bearing modules 12a, 12b on both lateral sides of the stator 5. A first flange 16a is mounted at an end of the stator 5 and a second flange 16b is mounted at an opposite end of the stator 5. The flanges 16a and 16b may also provide hermeticity of the hermetic chamber 2.

Besides, as represented in the FIG. 1, the cooling means may include a cooling device 17, in the hermetic chamber, comprising a cooling jacket, preferably located against the inner surface of the casing 3, and equipped with a spiral pipe for circulation of a water and glycol mixture for the dissipation of the heat produced by the stator 5, windings 9 and conducted by the other parts in contact such as the hermetic chamber and the flange 2, 16a.

Furthermore, the rotor 6 comprises an annular protecting sleeve or hoop 18 for the protection of magnets 11 from aggressive and/or explosive cooling gas, such as flare gas or $H_2$. The hoop 18 of the rotor 6 extends around an outer surface of the magnets 11 and is made, at least partially, of a polyetheretherketone (PEEK) resin or an epoxy resin.

In the illustrated example, the hoop 18 comes radially into contact with the outer surface of the magnets 11.

The hoop 18 enables to maintain the permanent magnets 11 submitted to centrifugal effects onto the shaft 7 and, then to transmit the electromagnetic torque to the shaft 7.

The hoop 18 exerts a pre-stress on the magnets 11, so as to press them against the shaft housing 8 and the rotor shaft 7 so that they do not become detached under the centrifugal effect and so that they can transmit the electromagnetic torque in the permanent magnets 11 to the shaft 7.

Advantageously, the hoop 18 of the rotor 6 is made of a composite material based on a matrix of PEEK resin or epoxy resin, optionally reinforced with fibers, for example carbon fibers. Fiber reference can be adapted to the maximal rotation speed of the rotor 6.

PEEK resin and epoxy resin are advantageously compatible with aggressive and explosive gas such as flare gas and particularly resistant.

Carbon fibers of a PEEK resin or epoxy resin based composite material improve the mechanical and thermal resistance of the hoop 18 of the rotor 6 and its compatibility to aggressive and explosive gas. Besides, carbon fibers allow to reduce the mass of the material in order not to affect the performances of the rotary electrical machine 1.

For example, the hoop 18 of the rotor 6 can be made of a composite material including PEEK resin, particularly compatible with aggressive and explosive gas, and TAIRY-FIL® TC42S carbon fiber.

The hoop 18 of the rotor 6 is preferably located in direct contact with the outer surface of the magnets 11 of the rotor 6.

Preferably, the stator 5 also includes an annular protecting sleeve or tube 19 for the protection of windings 9, as well as laminations 10, copper wires and their connections, from aggressive and/or explosive cooling gas. The protecting sleeve 19 of the stator 5 extends inside an inner surface of the windings 9 and is made of an electrical insulating and amagnetic material, for example a non-metallic material. The inner surface of the windings 9 forms the bore of the windings.

A radial gap (not referenced) is provided between the protecting sleeve 19 of the stator 5 and the hoop 18 of the rotor 6.

According to an embodiment, the stator 5 may not include a protecting sleeve 19.

Advantageously, the protecting sleeve 19 of the stator 5 may be made, at least partially, of a PEEK resin or an epoxy resin and, preferably, made of a composite material based on a matrix of PEEK resin or epoxy resin. Optionally, the composite material can be reinforced with fibers, for example carbon fibers. Fiber reference, ply orientations and width of the fibers can be adapted to the internal gas pressure level.

PEEK resin and epoxy resin are advantageously compatible with aggressive and explosive gas such as flare gas and particularly resistant.

Carbon fibers of a PEEK resin or epoxy resin based composite material improve the mechanical and thermal resistance of the protecting sleeve 19 of the stator 5 and its compatibility to aggressive and explosive gas. Non-magnetic carbon fiber composite material use allows to avoid any perturbance of the electrical machine magnetic circuits in order not to affect the performances of the rotary electrical machine 1.

For example, the protecting sleeve 19 of the stator 5 can be made of a composite material including PEEK resin and TAIRYFIL® TC428 carbon fiber.

Preferably, the rotary electrical machine 1 comprises a sealing and cooling element 20 overmolded onto the stator 5, hereafter referred to as overmolded element 20, for protection of the stator 5 from aggressive and/or explosive gas and a correct cooling of the stator 5.

The overmolded element 20 is a thermal conductor which contributes to the cooling by transferring the thermal fluxes.

According to an embodiment, the rotary electrical machine 1 may not include a sealing and cooling element 20 overmolded onto the stator 5.

In the illustrated example, the overmolded element 20 is overmolded onto the windings 9 and the laminations 10 and fills in, preferably, all empty volumes of the windings 9 and the laminations 10.

Advantageously, overmolded element 20 may fill in all empty volumes of the stator 5.

The overmolded element 20 is preferably made of a polymeric material with a polymerization temperature close to the normal operating temperature of the rotary electrical machine 1, in order not to create thermoelastic stresses inside the stator 6. Normal operating temperature of the rotary electrical machine 1 refers to nominal operating conditions.

Advantageously, the overmolded element 20 has good thermal conductivity properties for an improved cooling of the stator assembly 4, good sealing properties for preventing the leakage of the processed gas externally to the rotary electrical machine 1.

The overmolded element 20 material has, preferably, a minimized volume and mass for manufacturing concern.

The overmolded element 20 can be made of a resin, for example an epoxy resin. For example, the epoxy resin can be a mixture of Araldite® XB2252 and Aradur® XB2253.

The overmolded element 20 may be located in all the gaps of the hermetic chamber between the casing 3 and the stator 5 and, preferably, between wires of coils of the stator assembly 4 for an improved sealing and cooling effect of the stator assembly 4, as well as an improved protection of the stator 5 from aggressive and/or explosive gas. The overmolded element 20 may be located in order to overmold and seal the rotary electrical machine 1 interfaces such as power and temperature probe terminals.

All the remaining space inside the stator 5 cavities are preferably filled by the overmolded element 20, such as around the windings 9, ends of the windings 9, inside slots the laminations 10, around feedthrough, etc.

Furthermore, the two flanges 16a and 16b adapted to support active magnetic bearing modules 12a, 12b on both lateral sides of the stator 5 are preferably made of an amagnetic material to avoid extra-heating due to eddy current losses. For example, the two flanges 16a and 16b can be made with non-magnetic austenitic stainless steel.

As shown in FIG. 1, the first and second flanges 16a, 16b and the protecting sleeve 19 of the stator 5 define together a closed chamber inside which are located the stator 5.

Besides, the two flanges 16a and 16b each may comprise an inner wall, respectively 21a and 21b, having a shape adapted to conform with the shape of one end of the stator 5. In this manner, the overmolded element 20 volume, the resin volume in the illustrated example, can be minimized and then adapted to the polymerization speed of the resin used.

Besides, the two flanges 16a and 16b may be assembled to the rotary electrical machine 1 with at least one Belleville washer 22. Belleville washers 22 allow the limitation of the tension of the screws used to fix the flanges 16a and 16b due to thermal differential expansion between the overmolded element 20 and the parts around such as the casing 3, the flanges 16a and 16b and the cooling device 17.

Preferably, the rotary electrical machine 1 comprises seals, for example O-ring seals and flat seals.

O-ring seals 23a are located in order to ensure hermeticity during the overmolding of the overmolded element 20 and during operation, forming a barrier against processed gas penetration into the stator 5.

The hermeticity to processed gas provided by the protecting sleeve 19 of the stator 5 is particularly improved when combined with the O-ring 23a.

Besides, O-ring seals 23b are located to ensure hermeticity between the water and glycol mixture and the overmolded element 20.

O-ring seals 23c are located in order to ensure hermeticity between the overmolded element 20 and the rotary electrical machine 1 outside at the feedthrough.

Figure 2:
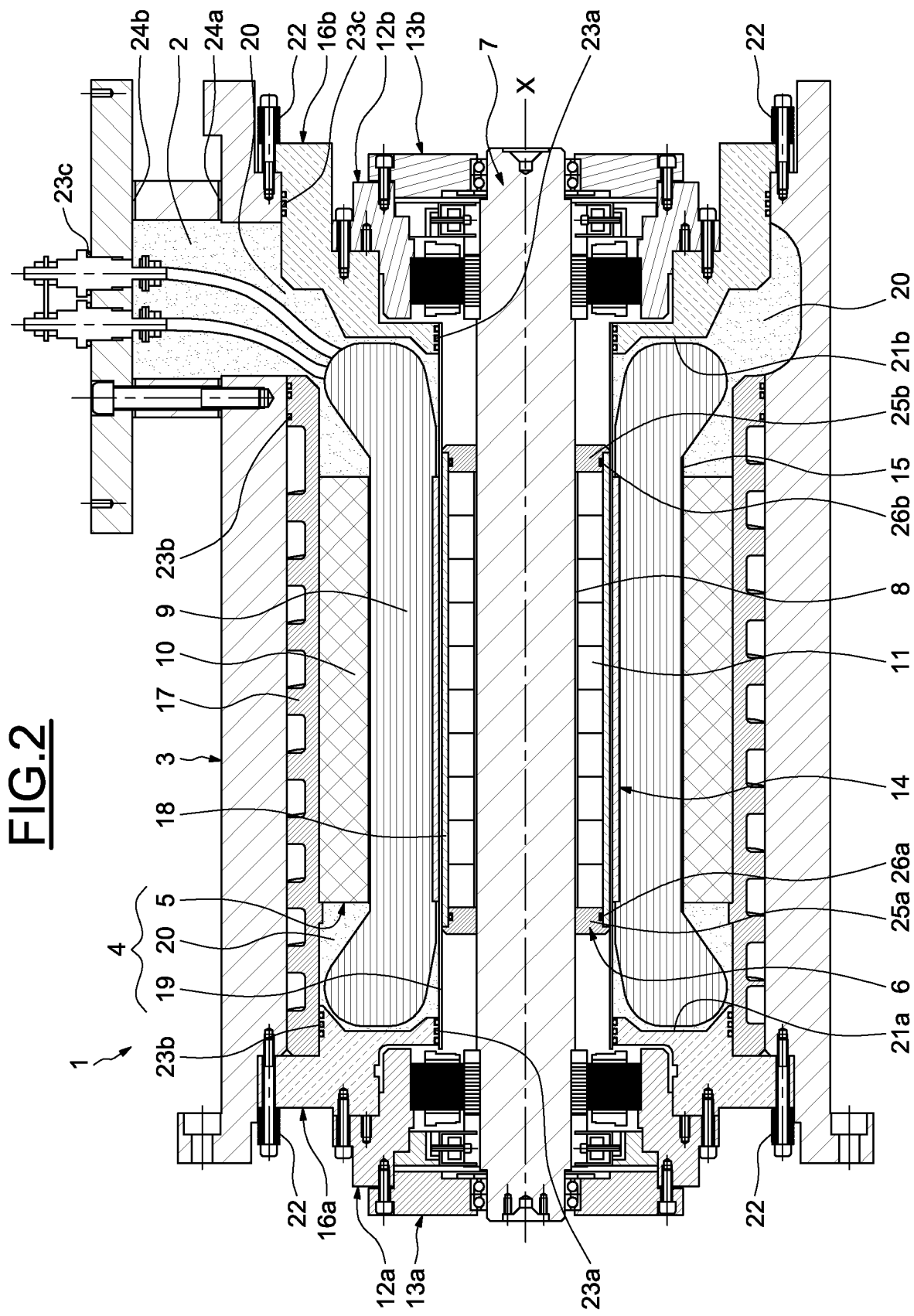
FIG. 2 is a sectional view of a hermetic rotary electrical machine, according to another embodiment of the invention.

As shown in the FIGS. 1 and 2, the rotary electrical machine 1 comprise a set of at least three O-ring seals per location in case of damage of one O-ring seal 23 during the overmolding of the overmolded element 20.

The two flanges 16a and 16b may comprise grooves for insertion of the O-ring seals 23a.

Flat seals 24a and 24b are located in order to ensure hermeticity between the overmolded element 20 and the rotary electrical machine 1 outside at a power junction box.

Besides, flat seals are located in order to ensure hermeticity between the overmolded element 20 and the rotary electrical machine 1 outside at a temperature probes junction box.

Preferably, the rotary electrical machine 1 also comprises first and second rings 25a, 25b for protection of the end surfaces of permanent magnets against aggressive and/or explosive gas.

The first and second rings 25a, 25b are supported by the shaft 7. The first ring 25a is mounted at an end of the magnets 11 and the second ring 25b is mounted at an opposite end of the magnets 11 to protect laterals end faces of the magnets 11. In other words, the first ring 25a is mounted at one axial end of the stack of magnets 11 and the second ring 25b is mounted at the opposite axial end of the stack. In the illustrated example, each of the first and second rings 25a axially abuts against one of the magnets 11. Alternatively, an axial gap may be provided between each of the first and second rings 25a and the associated magnet 11. Preferably, the axial gap is minimized.

Both opposite ends of the hoop 18 of the rotor 6 each radially comes into contact of one of the first and second rings 25a, 25b so that the first and second rings 25a, 25b and the hoop 18 of the rotor 6 define together a closed chamber inside which are located the magnets 11.

A radial gap (not referenced) is provided between the protecting sleeve 19 of the stator 5 and the first and second rings 25a, 25b of the rotor 6.

For example, the first and second rings 25a, 25b can be made of stainless steel.

Advantageously, the hoop 18 of the rotor 6 can be fixed to the first and second rings 25a, 25b and/or the magnets 11.

Preferably, permanent magnets 11 are glued onto the shaft housing 8. The hoop 18 is slipped around the magnets and the rings 25a and 25b are brought together to form a subset. After that this subassembly is inserted by force, radial shrinkage of all the parts of the sub-assembly, by pushing axially on 1 ring 25. Then, the hoop 18 is "attached" to the rings 25a and 25b and the permanent magnets 11.

According to art alternative embodiment illustrated in FIG. 2, in which identical parts are given identical references, the rotary electrical machine 1 comprises two O-ring seals 26a and 26b in order to increase the hermeticity of the closed chamber defined by the first and second rings 25a, 25b and the hoop 18. Each of the two O-ring seals 26a and 26b is located between one of the two ends of the hoop 18 and one of the first and second rings 25a, 25b.

For example, each ring 25a, 25b includes a groove on its outer surface for receiving one of the two O-ring seals 26a, 26b.

According to another embodiment, the rotary electrical machine 1 may comprise more than two O-rings, for example two or three at each end of the rotor 6.

The hoop 18 of the rotor 6 allows the rotary electrical machine 1, in particular the permanent magnets, to be advantageously protected against the risk of corrosion by the processed gas, but also their explosion or leakage externally to the machine 1. Preferably, this protection against the risk of explosion and corrosion is improved by combination of the overmolded element 20 with overmolded element 20 and/or the protecting sleeve 19 of the stator 5.

The invention claimed is:

1. A rotor for a rotary electrical machine, the rotor comprising:
   a shaft,
   magnets supported by the shaft and delineated at one end by a first ring and at the opposite end by a second ring,
   a hoop sleeve which extends between the first ring and the second ring, and
   an annular protecting sleeve positioned on a radially outer side of the hoop sleeve, the annular protecting sleeve having first and second protective sleeve axial ends, wherein
   the first and second annular protecting sleeve axial ends each extend axially outwardly past the first and second rings, respectively, and wherein
   the annular protecting sleeve is at least partially made of polyetheretherketone (PEEK) resin.

2. The rotor according to claim 1, wherein the protecting sleeve radially comes into contact with the outer surface of the magnets.

3. The rotor according to claim 1, further comprising at least first and second rings supported by the shaft, the first ring being mounted at an end of the magnets and the second ring being mounted at an opposite end of the magnets.

4. The rotor according to claim 3, wherein the first and second rings and the protecting sleeve define together a closed chamber inside which are located the magnets.

5. The rotor according to claim 4, further comprising at least two O-ring seals, each of the two O-ring seals being located between one of the two opposite ends of the protecting sleeve and one of the first and second rings.

6. The rotor according to claim 1, wherein the protecting sleeve is made at least partially of a composite material based on a matrix of PEEK or epoxy resin.

7. The rotor according to claim 1, wherein the protecting sleeve is made at least partially of a composite material based on a matrix of PEEK or epoxy resin reinforced with fibers, notably carbon fibers.

8. A rotary electrical machine comprising:
   a casing delimiting a hermetic chamber,
   a stator assembly mounted inside the hermetic chamber and comprising a stator provided with windings, and
   a rotor for rotary electrical machine, the rotor comprising a shaft and magnets supported by the shaft, and a protecting sleeve extending around an outer surface of the magnets and being made at least partially of PEEK or epoxy resin mounted within the stator,
   wherein the rotary electrical machine comprises at least two active magnetic bearing modules supported by at least two flanges mounted at opposite ends of the stator, the at least two flanges extending radially outward from the at least two active magnetic bearing modules.

9. The rotary electrical machine according to claim 8, wherein the stator includes a protecting sleeve extending inside an inner surface of the windings and being made of an amagnetic material.

10. The rotary electrical machine according to claim 9, wherein the protecting sleeve is made at least partially of PEEK or epoxy resin.

11. The rotary electrical machine according to claim 9, wherein the protecting sleeve is made at least partially of a composite material reinforced with fibers, preferably carbon fibers.

12. The rotary electrical machine according to claim 8, wherein a sealing and cooling element is overmolded onto the stator.

13. The rotary electrical machine according to claim 12, wherein the overmolded element is made of an epoxy resin.

14. The rotary electrical machine according to claim 12, wherein the overmolded element is located in all the gaps of the hermetic chamber between the casing and the stator.

15. The rotary electrical machine according to claim 8, wherein the at least two flanges being are made of an amagnetic material.

16. A rotary electrical machine comprising:
   a casing delimiting a hermetic chamber,
   a stator assembly mounted inside the hermetic chamber and comprising a stator provided with windings, and
   the rotor of claim 1,
   wherein the rotary electrical machine comprises at least two active magnetic bearing modules supported by a first flange and a second flange mounted at opposite ends of the stator, the first and second flanges extending radially outward from the at least two active magnetic bearing modules, and wherein the first and second flanges in combination with the first and second protective sleeve axial ends form a barrier to reduce contamination of the rotor and the shaft.

17. A rotary electrical machine comprising:

a casing, a stator assembly mounted inside the casing and comprising a stator provided with windings, and a rotor for rotary electrical machine, the rotor comprising a shaft and magnets supported by the shaft, and a protecting sleeve extending around an outer surface of the magnets and being made at least partially of PEEK or epoxy resin mounted within the stator, wherein the rotary electrical machine comprises at least two active magnetic bearing modules supported by at least two flanges mounted at opposite ends of the stator, the at least two flanges extending radially outward from the at least two active magnetic bearing modules.

18. The rotary electrical machine according to claim 17, wherein the stator includes a protecting sleeve extending inside an inner surface of the windings and being made of an amagnetic material.

19. The rotary electrical machine according to claim 18, wherein the protecting sleeve is made at least partially of a composite material reinforced with fibers, preferably carbon fibers.

20. The rotary electrical machine according to claim 17, wherein a sealing and cooling element is overmolded onto the stator.

* * * * *